US012612489B2

(12) United States Patent
Le Fevere De Ten Hove et al.

(10) Patent No.: US 12,612,489 B2
(45) Date of Patent: Apr. 28, 2026

(54) GLYCIDYL ESTERS OF α, α BRANCHED ACIDS FROM RENEWABLE SOURCES AND FORMULATIONS THEREOF

(71) Applicant: Hexion Inc., Columbus, OH (US)

(72) Inventors: Cédric Le Fevere De Ten Hove, Ottignies Louvain-la-Neuve (BE); Christophe Steinbrecher, Ottignies Louvain-la-Neuve (BE); Robert Van't Sand, Ottignies Louvain-la-Neuve (NL); Denis Heymans, Ottignies Louvain-la-Neuve (BE); Jimmy Antonius Van Rijn, Ottignies Louvain-la-Neuve (NL); Robin Christiaan Martens, Ottignies Louvain-la-Neuve (NL)

(73) Assignee: HEXION INC., Columbus, OH (US)

( * ) Notice: Subject to any disclaimer, the term of this patent is extended or adjusted under 35 U.S.C. 154(b) by 933 days.

(21) Appl. No.: 17/767,008

(22) PCT Filed: Sep. 30, 2020

(86) PCT No.: PCT/EP2020/000167
§ 371 (c)(1),
(2) Date: Apr. 6, 2022

(87) PCT Pub. No.: WO2021/073764
PCT Pub. Date: Apr. 22, 2021

(65) Prior Publication Data
US 2022/0363819 A1    Nov. 17, 2022

(30) Foreign Application Priority Data
Oct. 14, 2019    (EP) .................................... 19075014

(51) Int. Cl.
C08G 63/553        (2006.01)
C09D 167/06        (2006.01)
C09D 175/06        (2006.01)

(52) U.S. Cl.
CPC ......... C08G 63/553 (2013.01); C09D 167/06 (2013.01); C09D 175/06 (2013.01)

(58) Field of Classification Search
CPC combination set(s) only.
See application file for complete search history.

(56) References Cited

U.S. PATENT DOCUMENTS

| | | | |
|---|---|---|---|
| 2007/0117938 A1 | 5/2007 | Martz et al. | |
| 2015/0378062 A1* | 12/2015 | Suzuki | C09D 4/00 427/160 |
| 2017/0210936 A1* | 7/2017 | Lorenzo | C09J 4/00 |

FOREIGN PATENT DOCUMENTS

| | | | | |
|---|---|---|---|---|
| EP | 2261220 A1 * | 12/2010 | ........... | C07D 303/16 |
| JP | S55060575 A | 7/1980 | | |
| JP | S62226161 A | 10/1987 | | |
| JP | H03231926 A | 10/1991 | | |
| JP | H09143430 A | 6/1997 | | |
| JP | 2898717 B2 | 6/1999 | | |
| JP | 2014-129510 | 7/2014 | | |
| WO | WO 2007/061664 | 5/2007 | | |
| WO | WO 2013/056814 A2 | 4/2013 | | |
| WO | WO 2013/056815 A1 | 4/2013 | | |
| WO | WO 2013/056816 A1 | 4/2013 | | |

OTHER PUBLICATIONS

Preparation of glycidyl ester of rosin and application thereof in synthesis of polyester, Zheng et al., Journal of Fuzhous University, vol. 30., No. 6, Dec. 2002, pp. 895-902 (Year: 2002).*
Qiu-Jian Zheng, Xiao-Ping Xu; vol. 30, No. 6 of Journal of Fuzhou University (Natural Science); Dec. 2002; pp. 895-899.

* cited by examiner

*Primary Examiner* — Peter A Salamon

(57) ABSTRACT

The invention relates to compositions of α,α-branched alkane carboxylic acids glycidyl esters which derived from rosin and or hydrogenated rosin reacted with an epihalohydrin. The above glycidyl esters compositions can be used for example, as monomer in binder compositions for paints or adhesives, as reactive diluent or as acid scavenger. This invention is also about the uses of rosin and or hydrogenated rosin glycidyl ester in combinations with polyester polyols, or acrylic polyols, or polyether polyols.

14 Claims, No Drawings

GLYCIDYL ESTERS OF α, α BRANCHED ACIDS FROM RENEWABLE SOURCES AND FORMULATIONS THEREOF

RELATED APPLICATION DATA

This application claims the benefit of PCT Application PCT/EP2020/000167 with an International Filing Date of Sep. 30, 2020, published as WO 2021/073764, which further claims priority to European Patent Application No. EP 19075014.1 filed Oct. 14, 2019; the entire contents of both are hereby incorporated by reference.

The present invention relates to compositions of α,α-branched alkane carboxylic acids glycidyl esters which derived from rosin (from different origin: gum, tall oil for example) or hydrogenated rosin, reacted with an epihalohydrin. The rosin used in the invention is composed of diterpenic monocarboxylic acids with the generic formula $C_{19}H_{29}COOH$. The carboxylic acid is a tri-alkyl acetic derivative and moreover with a tricyclic carbon skeleton. The crude rosin is a blend of several isomers with two or three unsaturations, could be conjugated or not. The crude rosin is a solid brittle product with a dark brown color, lower colored products are obtained after partial or complete hydrogenation of the unsaturations. The tertiary carboxylic acids are reacted with epihalohydrin to produce the glycidyl ester comparable to, for example, neoalkanoic acids glycidyl esters like neononanoic acids or neodecanoic acids glycidyl esters. This invention gives different and unexpected performance in combination with some polymers such as for example polyester polyols such as for example to improved hardness, higher glass transition temperature (Tg), a faster drying of the coatings derived thereof.

The glycidyl esters of the rosin derivatives can be obtained according to JPS5560575, JPS6469680, JPH03115480, JPH09143430 or by the application of the process according to claim 1 or 2 of the present invention.

The above glycidyl esters compositions can be used for example, as monomer in binder compositions for paints or adhesives, as reactive diluent or as acid scavenger.

Other uses of the glycidyl ester are the combinations with polyester polyols, or acrylic polyols, or polyether polyols, or polyether-ester polyols or with alkyd resins. The combination of acrylic polyols with polyester polyols such as the one used in the car industry coating leads to a fast-drying coating system with attractive coating properties. The coating compositions could be in organic solvent or water based or solid to be used in powder coating applications. The coating could be applied on metal, plastic or wood with the appropriate technic.

The above glycidyl esters compositions can be used for example, as reactive diluent in formulations comprising epoxy resins such as EPIKOTE 828. The curing agents can be amines, anhydrides or acids, like diethylenetriamine, nadic methyl anhydride or cyclohexanedicarboxylic acid, respectively.

The invention is also about the process to prepare the epoxy resin curable compositions, which are obtained by the incorporation of the mixture of the glycidyl esters, as described above, into a mixture comprising epoxy resins and curing agents.

Above mentioned resins can be for instance aromatic or aliphatic halogenated or not halogenated glycidyl ether resins. Commercially available halogenated resins are for example EPON 1163, EPIKOTE 5123, EPIKOTE 5119 and EPIKOTE 5112 (EPON/EPIKOTE from Hexion) or any other glycidyl ether of tetra-bromo-Bis-Phenol derivatives which contains more than 10 weight % of brome on resinous material. Examples of non-halogenated epoxy resins are the diglycidyl ether of Bisphenol A, and/or Bisphenol F and/or polyglycidyl ethers of phenol/cresol-formaldehyde novolacs, and the like. Commercial examples of such resins are: EPIKOTE 828, EPIKOTE 834, EPIKOTE 1001, EPIKOTE 1002, EPIKOTE 154, EPIKOTE 164.

Amines, anhydrides and acids can be used as curing agent hardener).

Above mentioned amines can be for instance an aliphatic amine such as diethylenetriamine (DETA), triethylenetetramine (TETA), tetraethylenepentamine (TEPA), isophorone diamine (IPD), para-aminocyclohexane methylene (PACM), diamino cyclohexane (DCH), meta-Xylene diamine (mXDA), 4,4'-Diamino 3,3'-dimethyl diCyclohexyl methane (DDCM) and adducts of aliphatic amines such as based on DETA, TETA, TEPA, IPD, PACM, DCH, mXDA, DDCM and the like; or aromatic amine such as MDA.

Above mentioned anhydrides that could be used as hardener can be for instance cycloaliphatic anhydride. Curable compositions disclosed herein may include one or more cycloaliphatic anhydride hardeners. Cycloaliphatic anhydride hardeners may include, for example, nadic methyl anhydride, hexahydrophthalic anhydride, trimellitic anhydride, dodecenyl succinic anhydride, phthalic anhydride, methyl hexahydrophthalic anhydride, tetrahydrophthalic anhydride, and methyl tetrahydrophthalic anhydride, among others. Anhydride curing agents may also include copolymers of styrene and maleic acid anhydrides and other anhydrides as described in U.S. Pat. No. 6,613,839. Hardener that can be used for curable compositions disclosed herein also include acids for instance derived from any above-mentioned anhydride.

The invention is also related to an epoxy resin curable composition useful for the impregnation of fibers applicable to the manufacturing of composite structures, laminates, coatings, flooring and putties applications comprising at least a mixture of the glycidyl esters described above.

According to another embodiment of the present invention, therein before specified composition can be used in flooring applications where high chemical resistance is required.

According to still another aspect of the present invention, said above composition is that it could be used in making composite material with glass, carbon or natural fiber by the technology known in the art.

According to still another aspect of the present invention, the above glycidyl ester could be used (as acid scavenger) in combination with polyester fibers to improve the hydrolytic stability during extrusion and during the use after.

As used herein, a "rosin" (from different origin: gum, tall oil for example) or, "rosin moiety" is intended to encompass a rosin, a rosin acid, as well as a rosin derivative which is a rosin that is treated, for example, disproportionated or hydrogenated. As known in the art, rosin is a blend of at least eight monocarboxylic acids (abietic acid, palustric acid, dehydroabietic acid, neo-abietic acid, levo-pimaric acid, pimaric acid, sandaracopimaric acid and isopimaric acid). Abietic acid can be a primary species and the other seven acids are isomers thereof. Because of the composition of a rosin, often the synonym, "rosin acid," is used to describe various rosin-derived products. A rosin moiety includes, as known in the art, chemically modified rosin, such as, partially or fully hydrogenated rosin acids, partially or fully dimerized rosin acids, functionalized rosin acids, disproportionated, isomerized or combinations thereof. Rosin is available commercially in a number of forms, for example, rosin acids, rosin ester and dimerized rosin, hydrogenated rosin are available for example from Eastman Chemicals under the product lines, Poly-Pale™ Dymerex™, Staybelite-E™, Foral™ Ax-E, Lewisol™ and Pentalyn™; Arizona Chemicals under the product lines, Sylvalite™ and Sylvatac™; and Arakawa-USA under the product lines, Pensel and Hypal.

Another aspect of the present invention is further illustrated with synthesis of the glycidyl ester of rosin (Rosin GE) or the glycidyl ester of a hydrogenated rosin (H-Rosin GE). The glycidation of the acid function of the rosin or the hydrogenated rosin is carried out according to the process of claim 1 and further illustrated in the examples.

Such glycidyl ester can be made by reacting an alkali salt of the carboxylic acid with a halo-substituted monoepoxide such as an epihalohydrin, e.g., epichlorohydrin (1-20 molar excess). The mixture is heated (50-150° C.) in the presence of a catalyst forming glycidyl ester plus alkali salt and water. The water and excess epihalohydrin are removed by azeotropic distillation, and the salt by-product, e.g., NaCl, is removed by filtration and/or washing. The glycidyl ester can also be made by reacting the carboxylic acid directly with epichlorohydrin under similar process conditions. The chlorohydrin ester intermediate formed during this reaction is subsequently treated with an alkaline material, e.g., sodium or potassium hydroxide, which yields the desired glycidyl ester. By-product salt is removed by washing and/or filtration, and water is removed by drying.

A process for the manufacture of the "rosin" or hydrogenated rosin glycidyl esters, comprising (a) the reaction of the rosin acid with a halo substituted monoepoxide such as an epihalohydrin (e.g. epichlorohydrin), in a 2-20 molar excess, in the presence of water and a water-miscible solvent, and in the presence of a catalyst, in an amount of at most 45 mol % of the molar amount of the "rosin" acid, at a temperature in the range of from 30 to 110° C. during a period in the range of from 0.5 to 2.5 hr, (b) addition of additional alkali metal hydroxide or alkali metal alkanolate up to a molar ratio in the range of from 0.9:1 to 1.2:1 and preferably from 0.95:1 to 1.10:1 as to the monocarboxylic acid groups and reaction at a temperature of from 0 to 80° C., (c) distillation of the obtained reaction mixture to remove the excess halo substituted monoepoxide and the solvent and water formed, and (d) removal of alkali metal halide salt, e.g. by washing the obtained glycidyl ester with water, after optionally treating the residual product with a concentrated aqueous alkali metal hydroxide or an alkali metal alcoholate solution, in order to complete the dehydrohalogenation (and preferably a dehydrochlorination).

Another preparation of the "rosin" glycidyl ester is to react a "rosin" and an epoxyalkyl from 1.02:1 to 1.50:1) to form an intermediate reaction product comprising a halohydrin, the epoxyalkyl halide is added to the acid with appropriate cooling of the reactants and/or the reaction mixture to keep the temperature of the reaction mixture below 80° C., whereupon the epoxyalkyl halide and the acid are reacted at a temperature below 80° C. (preferably in the range of from 55 to 75° C.) for a time sufficient to fully convert the amount of acid, optionally removing any excess epoxyalkyl halide from the reaction product prior to the ring closure reaction, subjecting the reaction product to a ring closure reaction (DHC) and optionally to one or more after treatments (ADHC) for removal of any remaining halo functionality.

optionally addition of a solvent before or after DHC to reduce the viscosity and to promote the phase separation after a water wash in order to remove the salt, optionally to use a reduced reactor pressure and reflux the excess of the epoxy alkyl halide back into the reactor for temperature control.

The catalyst to be used in the process of the present invention is preferably a homogeneous catalyst that does not require a solvent. The catalyst may be selected from the catalysts known in the prior art. Thus it may be selected from alkalimetal hydroxides, alkalimetal carbonates, alkaline earth hydroxides, alkalimetal or alkaline earth metal alcoholates, or ammonium salts and in particular hydroxides or halides of the formula $R'R''R'''R''''N^+Y^-$, wherein R', R'' and R''' independently of each other may represent an alkyl group having from 1 to 16 carbon atoms, which optionally may be substituted with one or more hydroxyl groups, wherein R'''' represents an alkyl group having from 1 to 16 carbon atoms, phenyl or benzyl, and wherein Y represents hydroxyl or halogen, such as chlorine, bromine or iodine. Also, the corresponding phosphonium salts and aromatic versions thereof like ethyl triphenyl phosphonium iodide may be used.

Preferred catalysts during the coupling reaction are ammonium salts and in particular hydroxides or halides of the formula $R'R''R'''R''''N^+Y^-$, wherein R1, R2 and R3 independently of each other may represent an alkyl group having from 1 to 10 carbon atoms, and Y represents chlorine or bromine.

As mentioned above, the process involves two steps; a coupling reaction and a ring closure reaction to convert the intermediate halohydrin into the desired glycidyl ester.

In ring closure reactions known from the art preferably relatively strong and water-soluble metal hydroxides or metal alcoholates are used. This so-called DHC reaction may be performed by addition of alkali metal hydroxide or alkali metal alkanolate. The reaction is preferably carried out at a temperature of from 50 to 90° C., and more preferably from 60 to 80° C. The brine formed during the ring closure reaction can be completely or partially removed, whereupon the product may be subjected to the optional after treatment.

The alkali metal hydroxide or alkali metal alkanolate that may be used in the above steps for DHC and the ADHC is preferably selected from sodium hydroxide or potassium hydroxide, a sodium alkanolate having from 1 to 6 carbon atoms, such as sodium isopropanolate, or potassium alcoholate. Most preferably sodium hydroxide or sodium alkanolate having from 1 to 6 carbon atoms is used. In these steps, sodium hydroxide is preferably used in an aqueous solution of a concentration of from 15 to 60% by weight and more preferably from 20 to 50% by weight.

Removing of the solvent and water from the reaction product can be done by stripping or distillation. It will be appreciated that a drying step can take place after the final washing step, if desired.

Methods Used

Test Methods for the Characterization of the Resins

The molecular weights of the resins are measured with gel permeation chromatography (Perkin Elmer/Water) in THF solution using polystyrene standards. Viscosity of the resins are measured with Brookfield viscometer (LVDV-I) at indicated temperature. Solids content are calculated with a function $(Ww-Wd)/Ww \times 100\%$. Here Ww is the weight of a wet sample, Wd is the weight of the sample after dried in an oven at a temperature 110° C. for 1 hour.

Tg (glass transition temperature) has been determined either with a DSC 7 from Perkin Elmer or with an apparatus from TA Instruments Thermal Analysis. Scan rates were respectively 20 and 10° C./min. Only data obtained in the same experimental conditions have been compared. If not, the temperature difference occurring from the different scanning rate has been proved not significant for the results compared.

Yellowness Value

Measurement obtained on Platinum-Cobalt scale using Lico 500 from Hach Lange

Methods for the Characterization of the Coatings

Pot-Life

Pot-life is determined by observing the elapsed time for doubling of the initial viscosity at room temperature, usually 24.0±0.5° C.

Application of Clearcoat

Q-panels are used as substrates. Then the panels are cleaned by a fast evaporating solvent methyl ethyl ketone or acetone.

Dust Free Time

The dust free time (DFT) of clear coat is evaluated by vertically dropping a cotton wool ball on a flat substrate from a defined distance. When the cotton ball contacts with the substrate, the substrate is immediately turned over. The dust free time is defined as the time interval at which the cotton wool ball no longer adhered to the substrate.

Hardness Development

Hardness development is followed using pendulum hardness tester with Koenig method Chemicals Used Rosin: available from Sigma-Aldrich Hydrogenated Rosin: available from Foreverest Glycidyl ester of rosin: synthesized according process of claims 1-2

Glycidyl ester of hydrogenated rosin: synthesized according process of claims 1-2

Cardura™ E10P: available from Hexion

Cardura™ 9: available from Hexion

Ethylene glycol: from Aldrich

Monopentaerythritol: available from Sigma-Aldrich

Methylhexahydrophthalic anhydride: available from Sigma-Aldrich

Acrylic acid: available from Sigma-Aldrich

Methacrylic acid: available from Sigma-Aldrich

Hydroxyethyl methacrylate: available from Sigma-Aldrich

Styrene: available from Sigma-Aldrich

2-Ethylhexyl acrylate: available from Sigma-Aldrich

Methyl methacrylate: available from Sigma-Aldrich

Butyl acrylate: available from Sigma-Aldrich isoBornyl Methacrylate: available from Sigma-Aldrich Xylene Di-t-Amyl Peroxide is Luperox DTA from Arkema tert-Butyl peroxy-3,5,5-trimethylhexanoate: available from Akzo Nobel n-Butyl Acetate from Aldrich Dichloromethane from Biosolve Thinner: A: is a mixture of Xylene 50 wt %, Toluene 30 wt %, ShellsolA 0 wt %, 2-Ethoxyethylacetate 10 wt %.

Thinner B: is butyl acetate

Curing agents, HDI: 1,6-hexamethylene diisocyanate trimer, Desmodur N3390 BA from Bayer Material Science or Covestro or Tolonate HDT LV2 from Perstorp Leveling agent: 'BYK 10 wt %' which is BYK-331 diluted at 10% in butyl acetate Catalyst: 'DBTDL 1 wt %' which is Dibutyl Tin Dilaurate diluted at 1 wt % in butyl acetate Pigment dispersant: Disperbyk 110 from BYK Surface leveling for paint: BYK 358N from BYK Defoamer: BYK 077 from BYK Settling control: Solthix 250 from Lubrizol Titanium oxide pigment: Ti-Pure TS6200 from The Chemours Company Thinner for paint formulation: Ethyl Ethoxypropionate from Sigma-Aldrich, methyl amyl ketone from Sigma-Aldrich HALS additive: Tinuvin 123 from BASF UVA additive: Tinuvin 1130 from BASF Curing agent for paint: Desmodur N3300 from Covestro Examples of Synthesis of the Glycidyl Esters of Rosin and Hydrogenated Rosin

EXAMPLE 1

750 grams hydrogenated Gum Rosin, 321 grams of toluene and 21.8 grams (0.04 mol/mol hydrogenated gum rosin) tetra methyl ammonium chloride (as 50% aqueous solution) were charged to the reactor and heated to 70° C.; epichlorohydrin was dosed to the reactor while cooling the reaction medium to about 70° C., the addition rate was kept low to allow for appropriate cooling; in total 253 grams epichlorohydrin were added over a period of about 90 minutes (1.1 mol/mol hydrogenated gum rosin). The addition time is hence a function of the cooling efficiency. The reaction was monitored and at the present conditions this took about 7 hours.

The ring closure reaction was performed in the presence of caustic at 70° C.; in total 246 g NaOH 50% (1.24 mol/mol hydrogenated gum rosin) was used. The NaOH was dosed, using a linear profile in 90 minutes. After 210 minutes of post reaction time the ring closure reaction was completed. Another 1375 grams of Toluene and 653 grams of water was added to wash out the salt. The brine phase has been removed after phase separation followed by a final water wash. The Toluene was removed from the product by stripping at reduced pressure.

The EGC of the product was analysed and found to be 2567 mmol/kg; the Colour Gardner (50% in Toluene) was 1.

Examples of Binder Preparation and Formulations

EXAMPLE 1 COMPARATIVE

The following constituents were charged to a reaction vessel equipped with a stirrer, a condenser and a thermometer: 92.4 grams of Cardura™ E10P, 24.0 grams of Butyl Acetate. That initial reactor charge has been heated up to 135° C. Then, the following mixture was added over a period of 1 h20 while keeping the temperature constant: 27.5 grams of acrylic acid, 1.2 grams of Di-t-Amyl Peroxide, 12.0 grams of n-Butyl Acetate. After further adding 1.2 grams of Di-t-Amyl Peroxide and 20.4 grams of n-Butyl Acetate, a post-cooking was pursued at 135° C. for 1 h.

EXAMPLE 2a

The following constituents were charged to a reaction vessel equipped with a stirrer, a condenser and a thermometer: 92.4 grams of Rosin GE, 24.0 grams of Butyl Acetate. That initial reactor charge has been heated up to 135° C. Then, the following mixture was added over a period of 1 h18 while keeping the temperature constant: 16.7 grams of acrylic acid, 1.2 grams of Di-t-Amyl Peroxide, 12.0 grams of n-Butyl Acetate. After further adding 1.2 grams of Di-t-Amyl Peroxide and 20.4 grams of n-Butyl Acetate, a post-cooking was pursued at 135° C. for 1 h.

EXAMPLE 2b

The following constituents were charged to a reaction vessel equipped with a stirrer, a condenser and a thermometer: 92.4 grams of H-Rosin GE, 24.0 grams of Butyl Acetate. That initial reactor charge has been heated up to 135° C. Then, the following mixture was added over a period of 1 h18 while keeping the temperature constant: 16.8 grams of acrylic acid, 1.2 grams of Di-t-Amyl Peroxide, 12.0 grams of n-Butyl Acetate. After further adding 1.2 grams of Di-t-Amyl Peroxide and 20.4 grams of n-Butyl Acetate, a post-cooking was pursued at 135° C. for 1 h.

Observations: Tg of acrylic polyols is impacted by the choice of glycidyl ester.

EXAMPLE 3

The adducts of Rosin GE or H-Rosin GE (see table 3) with acrylic acid (ACE-adduct) and with methacrylic acid (MACE-adduct) are acrylic monomers that can be used to formulate hydroxyl functional (meth)acrylic polymers.

TABLE 3

| | Compositions of the adducts intakes in parts by weight | | | |
|---|---|---|---|---|
| | Rosin GE Acrylic acid adduct | Rosin GE Meth acrylic acid adduct | H-Rosin GE Acrylic acid adduct | H-Rosin GE Meth acrylic acid adduct |
| Initial reactor charge | | | | |
| Rosin GE | 250 | 250 | | |
| H-Rosin GE | | | 250 | 250 |
| Acrylic acid | 51.0 | | 51.4 | |
| Methacrylic acid Radical Inhibitor | | 62.5 | | 63.0 |
| 4-Methoxy phenol Catalyst | 0.463 | 0.463 | 0.463 | 0.463 |
| DABCO T9 (0.07 wt % on Glycidyl ester) | 0.175 | 0.175 | 0.175 | 0.175 |

DABCO T9 and 4-Methoxy phenol (185 ppm calculated on glycidyl ester weight), are charged to the reactor.

The reaction is performed under air flow (in order to recycle the radical inhibitor).

The reactor charge is heated slowly under constant stirring to about 80° C., where an exothermic reaction starts, increasing the temperature to about 100° C.

The temperature of 100° C. is maintained, until an Epoxy Group Content below 30 meq/kg is reached. The reaction mixture is cooled to room temperature.

EXAMPLE 4

Acrylic Resins

A glass reactor equipped with stirrer was flushed with nitrogen, and the initial reactor charge (see table 4) heated to 140° C. The monomer mixture including the initiator was then gradually added to the reactor via a pump over 5 hours at this temperature. Additional initiator was then fed into the reactor during another period of 1 hour at 140° C. Finally, the polymer is cooled down to 135° C. and diluted to a solids content of about 75% with butyl acetate.

TABLE 4

| | Acrylic resins recipe | | | |
|---|---|---|---|---|
| | Example | | | |
| | Ex. 4a Weight % | Ex. 4b Weight % | Ex. 4c Weight % | Ex. 4d Weight % |
| Initial Reactor Charge | | | | |
| Cardura ™ E10P | 25.0 | 0 | 20.0 | 25.0 |
| Rosin GE | 0 | 0 | 5.0 | 0 |
| H-Rosin GE | 0 | 25.0 | 0 | 0 |
| Butyl Acetate | 14.0 | 14.0 | 14.0 | 14.0 |
| Di t-Amyl peroxide Feeding materials | 0.5 | 0.5 | 0.5 | 0.5 |
| Meth Acrylic acid | 9.9 | 5.4 | 9.2 | 9.9 |
| Hydroxyethylmeth-acrylate | 10.0 | 16.0 | 10.8 | 9.5 |
| Styrene | 20.0 | 20.0 | 20.0 | 20.0 |
| Methyl methacrylate | 14.0 | 12.6 | 13.9 | 0 |
| isoBornyl Meth-acrylate | 0 | 0 | 0 | 30.6 |
| Butyl Acrylate | 21.1 | 20.0 | 21.1 | 5.0 |
| Di t-Amyl peroxide Post cooking | 6.5 | 6.5 | 6.5 | 6.5 |
| Di t-Amyl peroxide Solvent adding at 130° C. | 1.0 | 1.0 | 1.0 | 1.0 |
| Butyl Acetate | 18.0 | 18.0 | 18.0 | 18.0 |
| Final solids content | 75.2% | 75.6% | 75.0% | 76.2% |
| Hydroxyl content | 3.1% | 3.2% | 3.0% | 3.0% |
| Color (Pt/Co) | 15 | 42 | 238 | 64 |

A clearcoat was then formulated (table 5) with the following ingredients and applied by barcoat 80 μm wet:

TABLE 5

| | Clearcoat formulation | | | |
|---|---|---|---|---|
| Resin of example ex 4(a-d) | Tolonate HDT | BYK 10 wt % in ButAc | DBTDL 1 wt % in ButAc | Butyl Acetate |
| 60.0 g | 16.3 g | 0.44 g | 2.26 g | Dilute until viscosity 40-55 mPa · s |

Comparative properties are shown in Table 6.

TABLE 6

| | Properties of clearcoats | | | |
|---|---|---|---|---|
| | Clearcoats of Example | | | |
| | Ex. 4a | Ex. 4b | Ex. 4c | Ex. 4d |
| VOC (g/l) | 418 | 448 | 404 | 441 |
| Initial viscosity (mPa · s) | 53.1 | 54.9 | 51.3 | 43.6 |
| Dust free time (min) | 16.5 | 9.5 | 8.5 | 10.0 |
| Koenig hardness 6 hrs (sec) | 3 | 8 | 6 | 7 |

Acrylic Resins

A glass reactor equipped with stirrer was flushed with nitrogen, and the initial reactor charge (see table 7) heated to 150° C. The monomer mixture including the initiator was then gradually added to the reactor via a pump over 5 hours at this temperature. Additional initiator was then fed into the reactor during another period of 1 hour at 150° C. Finally, the polymer is cooled down to 135° C. and diluted to a solids content of about 70% with butyl acetate.

TABLE 7

| Acrylic resins recipe | | | | |
|---|---|---|---|---|
| | Example | | | |
| | Ex. 4f W % | Ex. 4g W % | Ex. 4h W % | Ex. 4i W % |
| Initial Reactor Charge | | | | |
| Cardura ™ E10P | 25.0 | 0 | 15.0 | 0 |
| Cardura ™ 9 | 0 | 25.0 | 0 | 0 |
| Rosin GE | 0 | 0 | 10.0 | 0 |
| H-Rosin GE | 0 | 0 | 0 | 25.0 |
| Butyl Acetate | 5.0 | 5.0 | 5.0 | 5.0 |
| Di t-Amyl peroxide | 0.5 | 0.5 | 0.5 | 0.5 |
| Feeding materials | | | | |
| Meth Acrylic acid | 9.8 | 10.3 | 8.4 | 6.3 |
| Hydroxy ethyl methacrylate | 16.4 | 16.4 | 19.3 | 22.5 |
| Styrene | 20.0 | 20.0 | 20.0 | 20.0 |
| Methyl methacrylate | 12.0 | 12.6 | 12.0 | 12.0 |
| Butyl Acrylate | 16.8 | 16.3 | 15.3 | 14.2 |
| Di t-Amyl peroxide | 5.0 | 5.0 | 5.0 | 5.0 |
| Post cooking | | | | |
| Di t-Amyl peroxide | 0.5 | 0.5 | 0.5 | 0.5 |
| Solvent add at 130° C. | | | | |
| Butyl Acetate | 35.0 | 35.0 | 35.0 | 35.0 |
| Final solids content | 70.8% | 70.2% | 72.1% | 72.2% |
| Hydroxyl content | 3.9% | 4.0% | 4.0% | 4.0% |

A clearcoat was then formulated (table 8) with the following ingredients and applied by barcoat 80 μm wet:

TABLE 8

| Clearcoat formulation | | | | |
|---|---|---|---|---|
| Resin of example ex 4 | Tolonate HDT | BYK 10 wt % in ButAc | DBTDL 1 wt % in ButAc | Butyl Acetate |
| 60.0 g | 19.5 g | 0.44 g | 2.28 g | Dilute until viscosity 40-55 mPa · s |

Comparative properties are shown in Table 9.

TABLE 9

| Properties of clearcoats | | | | |
|---|---|---|---|---|
| | Clearcoats of Example | | | |
| | Ex. 4f | Ex. 4g | Ex. 4h | Ex. 4i |
| VOC (g/l) | 427 | 428 | 472 | 474 |
| Initial viscosity (mPa · s) | 54.9 | 55.5 | 53.4 | 55.8 |
| Dust free time (min) | 14.0 | 13.0 | 9.0 | 7.5 |
| Koenig hardness 6 hrs (sec) | 7 | 8 | 12 | 12 |

Acrylic Resins

A glass reactor equipped with stirrer was flushed with nitrogen, and the initial reactor charge (see table 10) heated to 140° C. The monomer mixture including the initiator was then gradually added to the reactor via a pump over 5 hours at this temperature. Additional initiator was then fed into the reactor during another period of 1 hour at 140° C. Finally, the polymer is cooled down to 135° C. and diluted to a solids content of about 75% with butyl acetate.

TABLE 10

| Acrylic resins recipe | | | | |
|---|---|---|---|---|
| | Example | | | |
| | Ex. 4k W % | Ex. 4l W % | Ex. 4m W % | Ex. 4n W % |
| Initial Reactor Charge | | | | |
| Cardura ™ E10P | 25.0 | 25.0 | 15.0 | 0 |
| Rosin GE | 0 | 0 | 10.0 | 0 |
| H-Rosin GE | 0 | 0 | 0 | 25.0 |
| Butyl Acetate | 14.0 | 14.0 | 14.0 | 14.0 |
| Di t-Amyl peroxide | 0.5 | 0.5 | 0.5 | 0.5 |
| Feeding materials | | | | |
| Cardura ™ E10P | 0 | 0 | 0 | 0 |
| Meth Acrylic acid | 9.9 | 9.9 | 8.4 | 6.3 |
| Hydroxy ethyl methacrylate | 17.1 | 17.1 | 19.3 | 22.5 |
| Styrene | 20.0 | 20.0 | 20.0 | 20.0 |
| Methyl methacrylate | 20.0 | 0 | 20.0 | 20.0 |
| isoBornyl Methacrylate | 0 | 28.0 | 0 | 0 |
| Butyl Acrylate | 8.0 | 0.0 | 7.3 | 6.2 |
| Di t-Amyl peroxide | 6.5 | 6.5 | 6.5 | 6.5 |
| Post cooking | | | | |
| Di t-Amyl peroxide | 1.0 | 1.0 | 1.0 | 1.0 |
| Solvent add at 130° C. | | | | |
| Butyl Acetate | 27.0 | 27.0 | 27.0 | 27.0 |
| Final solids content | 69.7% | 70.2% | 71.5% | 71.7% |
| Hydroxyl content | 4.0% | 4.0% | 4.0% | 4.0% |
| Color (Pt/Co) | 17 | 19 | 273 | 39 |

A clearcoat was then formulated (table 11) with the following ingredients and applied by barcoat 80 μm wet:

TABLE 11

| Clearcoat formulation | | | | |
|---|---|---|---|---|
| Resin of example ex 4 | Tolonate HDT | BYK 10 wt % in ButAc | DBTDL 1 wt % in ButAc | Butyl Acetate |
| 60.0 g | 19.7 g | 0.44 g | 2.27g | Dilute until viscosity 40-55 mPa · s |

Comparative properties are shown in Table 12.

TABLE 12

| Properties of clearcoats | | | | |
|---|---|---|---|---|
| | Clearcoats of Example | | | |
| | Ex. 4k | Ex. 4l | Ex. 4m | Ex. 4n |
| VOC (g/l) | 424 | 406 | 449 | 429 |
| Initial viscosity (mPa · s) | 51.6 | 51.0 | 51.0 | 53.4 |
| Dust free time (min) | 12.5 | 9.5 | 9.0 | 7.0 |

TABLE 12-continued

| Properties of clearcoats | | | | |
|---|---|---|---|---|
| | Clearcoats of Example | | | |
| | Ex. 4k | Ex. 4l | Ex. 4m | Ex. 4n |
| Koenig hardness 6 hrs (sec) | 7 | 13 | 14 | 14 |

EXAMPLE 5

Clear Coats for Automotive Refinish

Solvents were blended to yield a thinner mixture of the following composition (table 13):

TABLE 13

| Thinner composition | |
|---|---|
| Thinner | Weight % in solvent blend, theory |
| Toluene | 30.1% |
| ShellSol A | 34.9% |
| 2-ethoxyethyl acetate | 10.0% |
| n-Butyl acetate | 25.0% |
| Total | 100% |

A clearcoat was then formulated (table 14) with the following ingredients (parts by weight):

TABLE 14

| Clearcoat formulation | | | | |
|---|---|---|---|---|
| Resin of example ex 4 | Desmodur N3390 | BYK 10 wt % in ButAc | DBTDL 1 wt % in ButAc | Thinner |
| 60.0 g | 19.5 g | 0.44 g | 2.28 g | Dilute until viscosity 40-55 mPa · s |

These clear-coats can be applied by spray.

Pigmented 2K polyurethane

The same type of resin can be also be used in pigmented systems for industrial applications. An example of a white paint formulation is given below:

TABLE 15

| Example of pigmented paint formulation | |
|---|---|
| Ingredients | Intakes (part in grams) |
| PART A | |
| Acrylic polymer from example 4 (70% solids) | 31.6 |
| Dysperbyk 110 | 2.5 |
| BYK 358N | 2.3 |
| BYK 077 | 2.3 |
| Solthix 250 | 4.5 |
| Ti-Pure TS-6200 | 143.3 |
| Ethyl Ethoxypropionate | To achieve rolling dought-nut under high speed agitation |
| LETDOWN | |
| Acrylic polymer from example 4 (70% solids) | 151.3 |

TABLE 15-continued

| Example of pigmented paint formulation | |
|---|---|
| Ingredients | Intakes (part in grams) |
| Tinuvin 123 | 3.2 |
| Tinuvin 1130 | 4.1 |
| Ethyl Ethoxypropionate | 35.3 |
| Methyl amyl ketone | 14.2 |
| Dibutyl tin dilaurate | 0.07 |
| PART B | |
| N3300 (1.1:1 NCO:OH ratio) | 76.7 |

EXAMPLE 6

Rosin GE or H-Rosin GE Based Acrylic Polymers for Medium Solids First-Finish Clear Coats A reactor for acrylic polyols is flushed with nitrogen and the initial reactor charge (see table 16) heated to 140° C. At this temperature the monomer mixture including the initiator is added over 5 hours to the reactor via a pump. Additional initiator is fed into the reactor during one hour, and then the mixture is kept at 140° C. to complete the conversion in a post reaction. Finally, the polymer is cooled down and diluted with butyl acetate to a solids content of about 60%.

TABLE 16

| Acrylic resins recipe | |
|---|---|
| | Weight % |
| Initial reactor charge | |
| Rosin GE or H-Rosin GE | 25.0 |
| Xylene | 24.8 |
| Monomer mixture | |
| Acrylic acid | 6.4 |
| Butyl methacrylate | 12.9 |
| Butyl acrylate | 8.2 |
| Hydroxy-ethyl methacrylate | 10.6 |
| Styrene | 30.0 |
| Methyl methacrylate | 7.9 |
| Initiator | |
| Di-tert.-amyl peroxide (DTAP) | 1.5 |
| Post addition | |
| Di-tert.-amyl peroxide | 1.0 |
| Solvent (to dilute to 60% solids) | |
| Butyl acetate | 41.3 |

Clear Lacquer Formulation

Clear lacquers are formulated (see table 17) from the acrylic polymers by addition of Cymel 1158 (curing agent from CYTEC), and solvent to dilute to spray viscosity. The acidity of the polymer is sufficient to catalyze the curing process, therefore no additional acid catalyst is added. The lacquer is stirred well to obtain a homogeneous composition.

TABLE 17

| | Clear lacquer formulations | |
|---|---|
| Ingredients | Intakes (part by weight) |
| Acrylic polymer | 60.0 |
| Cymel 1158 | 8.8 |
| Butyl acetate | to application viscosity |

Application and Cure

The coatings are applied with a barcoater on Q-panels to achieve a dry film thickness of about 40 μm. The systems are flashed-off at room temperature for 15 minutes, then baked at 140° C. for 30 minutes. Tests on the cured systems are carried out after 1 day at 23° C.

EXAMPLE 7

A glass reactor equipped with stirrer was flushed with nitrogen, and the initial reactor charge (see table 18) heated to 140° C. The monomer mixture including the initiator was then gradually added to the reactor via a pump over 5 hours at this temperature. Additional initiator was then fed into the reactor during another period of 1 hour at 140° C. Finally, the polymer is cooled down to 135° C. and diluted to a solids content of about 75% with butyl acetate.

TABLE 18

| | Acrylic resins recipe | | |
|---|---|---|---|
| Example | Ex.7a W % | Ex.7b W % | Ex.7c W % |
| Initial Reactor Charge | | | |
| Cardura ™ E10P | 15.0 | 0 | 0 |
| Rosin GE | 0 | 15.0 | 0 |
| H-Rosin GE | 0 | 0 | 15.0 |
| Butyl Acetate | 14.0 | 14.0 | 14.0 |
| Di t-Amyl peroxide | 0.5 | 0.5 | 0.5 |
| Feeding materials | | | |
| Cardura ™ E10P | 10.0 | 0 | 0 |
| Rosin GE | 0 | 10.0 | 0 |
| H-Rosin GE | 0 | 0 | 10.0 |
| Meth Acrylic acid | 9.9 | 5.4 | 5.4 |
| Hydroxy ethyl methacrylate | 10.0 | 16.0 | 16.0 |
| Styrene | 20.0 | 20.0 | 20.0 |
| Methyl methacrylate | 14.0 | 12.6 | 12.6 |
| Butyl Acrylate | 21.1 | 20.0 | 20.0 |
| Di t-Amyl peroxide | 6.5 | 6.5 | 6.5 |
| Post cooking | | | |
| Di t-Amyl peroxide | 1.0 | 1.0 | 1.0 |
| Solvent adding at 130° C. | | | |
| Butyl Acetate | 18.0 | 18.0 | 18.0 |
| Final solids content | 75.0% | 75.0% | 75.0% |
| Hydroxyl content | 3.1% | 3.1% | 3.2% |

EXAMPLE 8

Polyester by Polyaddition

Trimethylol propane, methylhexahydrophthalic anhydride or succinic anhydride and n-Butyl Acetate were charged to a reaction vessel and heated at boiling of butyl acetate until complete conversion. Cardura E10P or Rosin GE or H-Rosin GE is then dropwise added, and the reaction pursued at 150° C. until acceptable acid value is reached. The polyesters have a solid content of about 80.0 wt %. Recipes and properties are defined in Table 19.

TABLE 19

| | Recipes of polyester polyols | | | | |
|---|---|---|---|---|---|
| Example | Ex. 8a Weight % | Ex. 8b Weight % | Ex. 8c Weight % | Ex. 8d Weight % | Ex. 8e Weight % |
| Initial Reactor Charge | | | | | |
| Trimethylol propane | 14.2 | 10.8 | 10.8 | 13.5 | 11.7 |
| Methylhexahydrophthalic anydride | 36.0 | 27.4 | 27.2 | 34.1 | 0 |
| Succinic anhydride | 0 | 0 | 0 | 0 | 26.2 |
| Butyl Acetate | 25.0 | 25.0 | 25.0 | 25.0 | 25.0 |
| Feeding materials | | | | | |
| Cardura ™ E10P | 49.8 | 0 | 0 | 39.2 | 62.1 |
| Rosin GE | 0 | 0 | 62.0 | 13.2 | 0 |
| H-Rosin GE | 0 | 61.8 | 0 | 0 | 0 |
| Final solids content | 81.3% | 79.7% | 80.3% | 83.3% | 81.3% |
| Hydroxyl content | 5.3% | 4.0% | 4.0% | 5.1% | 4.4% |
| Acid value (mgKOH/g) | 7.0 | 5.6 | 6.4 | 7.1 | 4.7 |

The resins of the example 8 can be formulated in coating compositions such as 2K (polyurethane) with a low VOC (volatile organic compound) level and providing excellent appearance combined with high drying speed.

Polyester by Polycondensation

The same type of polyesters described in Table 20 can also be prepared by using multi-functional acids instead of anhydrides. The reaction of the acidic functions with hydroxyls is performed at temperature around 200-240° C. until adequate conversion in presence of an azeotropic solvent like xylene to remove the water generated during the process.

EXAMPLE 9

The resins of the example 8 can be blended with acrylic polyols in order to obtain suitable resins for e.g. automotive coatings. An example of acrylic resin is given in Table 19.

A glass reactor equipped with stirrer was flushed with nitrogen, and the initial reactor charge (see table 20) heated to 140° C. The monomer mixture including the initiator was then gradually added to the reactor via a pump over 5 hours at this temperature. Additional initiator was then fed into the reactor during another period of 1 hour at 140° C. Finally the polymer is cooled down to 135° C. and diluted to a solids content of about 75% with butyl acetate.

TABLE 20

| | Example of acrylic polyol for blending |
|---|---|
| Example | Ex. 9 Weight % |
| Initial Reactor Charge | |
| Cardura ™ E10P | 25.0 |
| Butyl Acetate | 14.0 |
| Di t-Amyl peroxide | 0.5 |
| Feeding materials | |
| Meth Acrylic acid | 9.9 |
| Hydroxy ethyl methacrylate | 10.0 |
| Styrene | 20.0 |
| Methyl methacrylate | 14.0 |
| isoBornyl Methacrylate | 0 |
| Butyl Acrylate | 21.1 |
| Di t-Amyl peroxide | 6.5 |

TABLE 20-continued

| | Ex. 9 |
|---|---|
| Example | Weight % |
| Post cooking | |
| Di t-Amyl peroxide | 1.0 |
| Solvent adding at 130° C. | |
| Butyl Acetate | 18.0 |
| Final solids content | 75.2% |
| Hydroxyl content | 3.1% |

The acrylic polyol is then blended with the polyester polyols from the example 8 at a level of 25 wt % polyester polyols for 75 wt % of acrylic polyol. The blend is used to formulated a clearcoat (Table 21) and applied by barcoat 80 µm wet:

TABLE 21

Blending of acrylic polyol with polyester polyols

| Blend 75/25 | Tolonate HDT | BYK 10 wt % in ButAc | DBTDL 1 wt % in ButAc | Butyl Acetate |
|---|---|---|---|---|
| 60.0 g | 17.9-19.9 g adapted to OH % | 0.45 g | 2.3 g | Dilute until viscosity 40-55 mPa · s |

Comparative properties are shown in Table 22.

TABLE 22

Properties of clearcoats

| | Clearcoats of Example | | | | |
|---|---|---|---|---|---|
| | Ex. 9a | Ex. 9b | Ex. 9c | Ex. 9d | Ex. 9e |
| VOC (g/l) | 384 | 383 | 392 | 386 | 381 |
| Initial viscosity (mPa · s) | 53.7 | 54.3 | 52.8 | 54.6 | 52.8 |
| Dust free time (min) | 44.0 | 17.5 | 15.0 | 26.0 | 46.5 |
| Koenig hardness 6 hrs (sec) | 1 | 7 | 7 | 3 | 3 |

EXAMPLE 10

The acrylic and polyester polyols from the example 8 and the example 9 can be prepared in the same reactor in a hybrid process. The polyester polyol is first synthesized and used as initial reactor charge to prepare the acrylic polyol on the go during the same reaction. An example of such process is described in Table 23 with Cardura E10P used in polyester polyols, but Rosin GE or H-Rosin GE can also be used in the preparation.

Trimethylol propane, methylhexahydrophthalic anhydride and n-Butyl Acetate were charged to a reaction vessel and heated at boiling of butyl acetate until complete conversion. Cardura E10P or Rosin GE or H-Rosin GE is then dropwise added and the reaction pursued at 150° C. for another hour to complete the acid conversion. The temperature inside the reactor is then dropped to 140° C. and the monomer mixture including the initiator was then gradually added to the reactor via a pump over 5 hours at this temperature. Additional initiator was then fed into the reactor during another period of 1 hour at 140° C. Finally the polymer is cooled down to 135° C. and diluted to a solids content of about 75% with butyl acetate.

TABLE 23

Polyester based acrylic polyol cooking (hybrid process)

| | Ex. 10a | Ex. 10b | Ex. 10c |
|---|---|---|---|
| 1°/Polyester cooking, constituent in weight % | | | |
| Trimethylol propane | 3.5 | 2.7 | 2.7 |
| Methylhexahydrophthalic anhydride | 9.0 | 6.8 | 6.8 |
| n-Butyl acetate | 5.0 | 5.0 | 5.0 |
| Cardura E10P | 12.5 | 15.5 | 15.5 |
| 2°/Acrylic polyol cooking, initial reactor charge in weight % | | | |
| Cardura E10P | 18.8 | 0 | 0 |
| Rosin GE | 0 | 0 | 18.8 |
| H-Rosin GE | 0 | 18.8 | 0 |
| Butyl acetate | 10.0 | 10.0 | 10.0 |
| 3°/Acrylic polyol cooking, feeding material in weight % | | | |
| Methacrylic Acid | 7.0 | 4.8 | 4.8 |
| Hydroxyethyl methacrylate | 9.8 | 12.0 | 12.0 |
| Styrene | 15.0 | 15.0 | 15.0 |
| Butyl Acrylate | 15.0 | 15.0 | 15.0 |
| Methyl methacrylate | 9.4 | 9.4 | 9.4 |
| Di-t-Amyl Peroxide | 5.3 | 5.3 | 5.3 |
| 4°/Acrylic polyol post cooking, feeding material in weight % | | | |
| Di-t-Amyl Peroxide | 0.75 | 0.75 | 0.75 |
| 5°/Acrylic polyol solid content adjustment, solvent adding in weight % | | | |
| n-Butyl acetate | 17.0 | 17.0 | 17.0 |

When applied in coatings, it has been observed that combining Rosin GE or H-Rosin GE with such hybrid process improves significantly both VOC (volatile organic compound) and early drying development.

EXAMPLE 11

A polyether was obtained by charging the following constituents to a reaction vessel: 2.5500 grams of a Rosin GE, 1.1571 grams of dichloromethane, 0.0137 grams of boron trifluoride diethyl etherate. The reaction took place for 3 days at room temperature and the solvent was then thoroughly removed by evaporation.

EXAMPLE 12

A polyether was obtained by charging the following constituents to a reaction vessel: 2.5500 grams of H-Rosin GE, 1.1571 grams of dichloromethane, 0.0137 grams of boron trifluoride diethyl etherate. The reaction took place for 3 days at room temperature and the solvent was then thoroughly removed by evaporation.

EXAMPLE 13 COMPARATIVE

A polyether was obtained by charging the following constituents to a reaction vessel: 2.5500 grams of Cardura E10P, 1.1571 grams of dichloromethane, 0.0137 grams of boron trifluoride diethyl etherate. The reaction took place for 3 days at room temperature and the solvent was then thoroughly removed by evaporation.

Observations: Tg of the modified polyether resin is impacted by the composition of the type of glycidyl ester, rosin-based glycidyl ester giving a higher Tg.

EXAMPLE 14

Polyether Resin

The following constituents were charged to a reaction vessel equipped with a stirrer, a thermometer and a condenser: 138 grams of di-Trimethylol propane (DTMP), 862 grams of Rosin GE, 135.5 grams of n-butylacetate (BAC) and 2.5 grams of Tin 2 Octoate. The mixture was heated to its reflux temperature of about 180° C. for about 4 hours till the Rosin GE was converted to an epoxy group content of less than 0.12 mg/g. After cooling down the polyether had a solids content of about 88%.

EXAMPLE 15

Polyether Resin

The following constituents were charged to a reaction vessel equipped with a stirrer, a thermometer and a condenser: 139 grams of di-Trimethylol propane (DTMP), 861 grams of H-Rosin GE, 135.5 grams of n-butylacetate (BAC) and 2.5 grams of Tin 2 Octoate. The mixture was heated to its reflux temperature of about 180° C. for about 4 hours till the H-Rosin GE was converted to an epoxy group content of less than 0.12 mg/g. After cooling down the polyether had a solids content of about 88%.

EXAMPLE 16 COMPARATIVE

Polyether Resin

The following constituents were charged to a reaction vessel equipped with a stirrer, a thermometer and a condenser: 123 grams of monopentaerythritol, 877 grams of Cardura E10P, 194 grams of n-butylacetate and 3.552 grams of Tin (II) 2-ethylhexanoate. The mixture was heated to a temperature of about 180° C. for about 6 hours till the Cardura E10P was converted to an epoxy group content of about 25 mmol/kg. After cooling down the polyether had a solids content of about 95%.

EXAMPLE 17

Polyether Resin

The following constituents were charged to a reaction vessel equipped with a stirrer, a thermometer and a condenser: 79 grams of monopentaerythritol, 921 grams of Rosin GE, 183 grams of n-butylacetate and 0.3550 grams of Tin (II) 2-ethylhexanoate. The mixture was heated to a temperature of about 180° C. for about 6 hours till the Rosin GE was converted to an epoxy group content of about 25 mmol/kg. After cooling down the polyether had a solids content of about 95%.

EXAMPLE 18

Polyether Resin

The following constituents were charged to a reaction vessel equipped with a stirrer, a thermometer and a condenser: 79 grams of monopentaerythritol, 921 grams of H-Rosin GE, 185 grams of n-butylacetate and 3.572 grams of Tin (II) 2-ethylhexanoate. The mixture was heated to a temperature of about 180° C. for about 6 hours till the H-Rosin GE was converted to an epoxy group content of about 25 mmol/kg. After cooling down the polyether had a solids content of about 95%.

Observation: significant improvement (quicker hardness development) is observed when replacing Cardura E10P by Rosin Ge or H-Rosin GE for the polyether cooking.

EXAMPLE 19

Preparation for Vacuum Infusion of Composite Structures

A resin for vacuum infusion of large structures such as yacht and wind turbines was prepared by mixing 27.7 part by weight of curing agent blend and 100 part of epoxy resins blend described here:

Epoxy resins blend: 850 part by weight Epikote 828 and 150 part of Rosin GE or H-Rosin GE.

Curing Agent blend: 650 part by weight of Jeffamine D230 and 350 part by weight of Isophorone diamine (IPDA).

Jeffamine D230 is a polyoxyalkyleneamines available from Huntsman Corporation. Epikote 828 is an epoxy resin available from Hexion Chemicals

EXAMPLE 20

Example of Trowelable Floor and Patching Compound

The ingredients presented in the table 24 below were mixed for the preparation of a trowelable flooring compound:

TABLE 24

Preparation of a trowelable flooring compound

|  | Weight (parts) | Volume (parts) | Supplier |
|---|---|---|---|
| BASE COMPONENT |  |  |  |
| EPIKOTE 828LVEL | 63.2 | 126.3 | Hexion |
| Rosin GE or H-Rosin GE | 11.1 | 22.3 |  |
| Byk A530 | 4.8 | 13.4 | Byk Chemie |
| Mix the additives into the EPIKOTE resin before filler addition |  |  |  |
| Total | 79.1 | 162.0 |  |
| FILLERS |  |  |  |
| Sand 1-2 mm | 582.3 | 496.4 | SCR Sibelco |
| Sand 0.2-0.6 mm | 298.4 | 254.4 | SCR Sibelco |
| Total | 880.7 | 750.8 |  |
| Disperse into the base component using a concrete mixer |  |  |  |
| CURING AGENT COMPONENT |  |  |  |
| EPIKURE F205 | 40.2 | 87.2 | Hexion |
| Total | 40.2 | 87.2 |  |
| Mix the curing agent well with the EPIKOTE resin base and Fillers before application |  |  |  |
| Total formulation | 1000.0 | 1000.0 |  |

EXAMPLE 21

Formulation for a Water Based Self-Leveling Flooring

The ingredients presented in the table 25 below were mixed for the preparation of a waterbased self-leveling flooring system.

TABLE 25

Preparation of a waterbased self-leveling flooring system

|  | Weight (parts) | Supplier | Comment |
|---|---|---|---|
| CURING AGENT COMPONENT (A) |  |  |  |
| EPIKURE 8545-W-52 (HEW = 320 g/eq) | 164.00 | Hexion |  |

TABLE 25-continued

Preparation of a waterbased self-leveling flooring system

| | Weight (parts) | Supplier | Comment |
|---|---|---|---|
| EPIKURE 3253 | 4.00 | Hexion | Accelerator |
| BYK 045 | 5.00 | BYK CHEMIE | defoamer |
| Antiterra 250 | 4.00 | BYK CHEMIE | Dispersing |
| Byketol WS | 5.00 | BYK CHEMIE | Wetting agent |
| Bentone EW (3% in water) | 20.00 | Elementis | Anti-settling |
| Mix the additive into the EPIKURE curing agents before filler addition | | | |
| Titanium dioxide 2056 | 50.00 | KronosTitan | |
| Disperse the pigment for 10 minutes at 2000 rpm. | | | |
| EWO-Heavy Spar | 195.00 | Sachtleben Chemie | Barium sulphate |
| Quartz powder W8 | 98.00 | Westdeutsche Quarzwerke | |
| Disperse fillers at 2000 rpm for 10 minutes | | | |
| Water | 55.00 | | |
| Sand 0.1-0.4 mm | 400.00 | Euroquarz | |
| | | | |
| Total component A | 1000.00 | | |
| RESIN COMPONENT (B) | | | |
| | | | |
| EPIKOTE 828LVEL | 81.00 | Hexion | |
| GE9H | 19.00 | | |
| | | | |
| Mix (B) into (A) | | | |
| Total formulation A + B | 1081.00 | | |

Formulation Characteristics

| Fillers + Pigment/Binder ratio | 3.9 | by weight |
|---|---|---|
| PVC | 37.7 | % v/v |
| Density | 1.9 | g/ml |
| Water content | 12.5 | % m/m |

EXAMPLE 22

Preparation of a Water-Based Acrylic Polyol Obtained Via Secondary Dispersion.

A glass reactor equipped with stirrer was flushed with nitrogen, and the initial reactor charge (see table 26) heated to 140° C. The monomer mixture including the initiator was then gradually added to the reactor via a pump over 5 hours at this temperature. Additional initiator was then fed into the reactor during another period of 1 hour at 140° C. The polymer is then cooled down to 80° C. and n,n-dimethyl ethanolamine is added and allow to react for 15 minutes under vigorous stirring. Pre-heated water at 80° C. is gradually added for 2 hrs in the reactor with a temperature maintained at 80° C. The waterborne resin is then cooled down at room temperature and discharge.

TABLE 26

Waterborne acrylic polyol recipes

| Example | Ex. 22a W % | Ex. 22b W % | Ex. 22c W % |
|---|---|---|---|
| Initial Reactor Charge | | | |
| Cardura ™ E10P | 30.0 | 0 | 0 |
| Rosin GE | 0 | 30.0 | 0 |
| H-Rosin GE | 0 | 0 | 30.0 |
| Butyl Glycol | 10.0 | 10.0 | 10.0 |
| Feeding materials | | | |
| Acrylic acid | 12.9 | 9.4 | 9.4 |
| Hydroxy ethyl methacrylate | 14.0 | 17.5 | 17.5 |

TABLE 26-continued

Waterborne acrylic polyol recipes

| Example | Ex. 22a W % | Ex. 22b W % | Ex. 22c W % |
|---|---|---|---|
| Styrene | 20.0 | 20.0 | 20.0 |
| Methyl methacrylate | 14.1 | 14.1 | 14.1 |
| Butyl Acrylate | 9.0 | 9.0 | 9.0 |
| Di t-Amyl peroxide | 2.5 | 2.5 | 2.5 |
| Post cooking | | | |
| Di t-Amyl peroxide | 0.5 | 0.5 | 0.5 |
| Final solids content | 91% | 91% | 91% |
| Hydroxyl content | 4.0% | 3.6% | 3.6% |
| Acid Value (mgKOH/g) | ±30 | ±30 | ±30 |
| Neutralization for100 g | W g | W g | W g |
| N,N-dimethyl ethanolamine | 3.2 | 3.2 | 3.2 |
| Dispersion for 100 g | W g | W g | W g |
| Water at 80° C. | 128 | 128 | 128 |
| Solids content of dispersion | ±40% | ±40% | ±40% |

The resins of the example 22 can be formulated in coating compositions such as 2K waterborne (polyurethane) with a near zero VOC (volatile organic compound) level and providing excellent appearance while maintaining high drying speed. It has been observed that acrylic polyols containing Rosin GE or H-Rosin GE induce faster dust free time early hardness development.

The invention claimed is:

1. A process for the manufacture of glycidyl esters of rosin and/or hydrogenated rosin, comprising
   (a) reacting a rosin acid with a epoxyalkyl halide in a 1.01-20 molar excess, in the presence of water and a water-miscible solvent, and in the presence of a catalyst, in an amount of at most 45 mol % of the molar amount of the rosin acid, at a temperature in the range of from 30 to 110° C. during a period of time in the range of from 0.5 to 2.5 hr,
   (b) adding an alkali metal hydroxide or alkali metal alkanolate up to a molar ratio in the range of from 0.9:1 to 1.2:1 as to the rosin acid and reacting at a temperature of from 0 to 80° C. to prepare a reaction mixture,
   (c) distilling the reaction mixture to remove the excess epoxyalkyl halide solvent and water formed, and
   (d) removing an alkali metal halide salt by washing the obtained glycidyl ester with water to complete the dehydrohalogenation.

2. The process of claim 1 in which the amount of epoxyalkyl halide is reacted in a coupling reaction with the rosin acid, in the molar ratio of epoxyalkyl halide to acid that is in the range of from 1.02:1 to 1.50:1, to form an intermediate reaction product comprising a halohydrin, wherein the epoxyalkyl halide is added to the rosin acid with appropriate cooling of the reaction mixture to keep the temperature of the reaction mixture below 80° C., whereupon the epoxyalkyl halide and the rosin acid are reacted at a temperature below 80° C. for a time sufficient to fully convert the amount of acid, and wherein the process further comprises the steps of
   optionally removing any unreacted epoxyalkyl halide prior to the ring closure reaction,
   subjecting the reaction product to a ring closure reaction (DHC) and optionally to one or more after treatments (ADHC) for removal of any remaining halo functionality,
   optionally adding a solvent before or after the DHC to reduce the viscosity and to promote the phase separation after the water washing to remove the salt, and optionally using a reduced reactor pressure and reflux excess of the epoxyalkyl halide back into the reactor for temperature control.

3. A resin formulation comprising the glycidyl ester of rosin and/or hydrogenated rosin produced by the process of claim 1 and a resin, wherein in the resin is selected from the group consisting of a polyester polyol resin, an acrylic polyol resin, a polyether polyol resin, a polyether-ester polyol resin, an epoxy resin and combinations thereof.

4. The resin formulation of claim 3 wherein the resin is a polyester polyol resin obtained by the reaction of a polycarboxylic acid compound and a mixture of rosin and/or hydrogenated rosin glycidyl esters, wherein the polycarboxylic acid compound is obtained by reacting of one or more multifunctional polyol with one or more anhydride or acid anhydrides.

5. The resin formulation of claim 4 wherein the acid value of the polyester polyol is lower than 20 mg KOH/g.

6. The resin formulation of claim 4 having a number average molecular weight (Mn) between 300 and 7000 Dalton, and a hydroxyl value between 40 and 320 mg KOH/g.

7. The resin formulation of claim 3 wherein the resin is an acrylic polyol resin obtained reacting an epoxy group with a carboxylic acid group of an ethylene carboxylic acid compounds from an hydroxyl ethylene carboxylate ester monomers, which are reacted with one or more unsaturated monomers via a radical polymerization reaction.

8. The resin formulation of claim 7 having a hydroxyl value between 50 and 180 mgKOH/g and a number average molecular weight (Mn) between 1500 and 50000 Dalton.

9. The resin formulation of claim 7 prepared in the presence of a polyester polyol.

10. A clear coating composition comprising 10 to 40 weight % of an aliphatic isocyanate, 0-25 weight % of the polyester polyol of claim 4, and 40 to 70 weight % the acrylic polyol of claim 7, with all weight % based on solids after evaporation of the solvent.

11. The resin formulation of claim 3 wherein the resin is a polyether polyol resin obtained by the reaction of at least one polyol having at least three hydroxyl groups and a mixture of rosin and/or hydrogenated rosin glycidyl esters.

12. The resin formulation of claim 11 having a number average molecular weight (Mn) is lower than 4500 Dalton and the hydroxyl value is above 120 mg KOH/g solids on solid.

13. A process for the manufacture of glycidyl esters of rosin and/or hydrogenated rosin, comprising
(a) reacting a rosin acid with an epoxyalkyl halide in a 1.01-20 molar excess, in the presence of water, and in the presence of a catalyst, in an amount of at most 45 mol % of the molar amount of the rosin acid, at a temperature in the range of from 30 to 110° C. during a period of time about 7 hr,
(b) adding an alkali metal hydroxide or alkali metal alkanolate up to a molar ratio of about 1.24:1 as to the rosin acid and reacting at a temperature of from 0 to 80° C. to prepare a reaction mixture, and
(c) removing an alkali metal halide salt by washing the obtained glycidyl ester with water to complete the dehydrohalogenation.

14. The process of claim 13, wherein the reacting step (a) occurs in the presence of water and toluene.

* * * * *